March 11, 1924.

R. O. FRASER

FOOD DISPENSER

Filed Sept. 11, 1922

1,486,328

INVENTOR
ROBERT O. FRASER
BY J. L. Rivers
ATTORNEY

Patented Mar. 11, 1924.

1,486,328

UNITED STATES PATENT OFFICE.

ROBERT O. FRASER, OF SEATTLE, WASHINGTON.

FOOD DISPENSER.

Application filed September 11, 1922. Serial No. 587,305.

*To all whom it may concern:*

Be it known that I, ROBERT O. FRASER, a citizen of the United States, residing at Seattle, in the county of King and State of Washington, have invented a new and useful Food Dispenser, of which the following is a specification.

My invention, relating as it does to improvements in devices for dispensing foods in plastic condition, has particular reference to improvements in the devices set forth in my application for Letters Patent of the United States for food dispensers, Serial No. 549,235, filed April 3, 1922; and the objects of my improvement are, to provide in a food dispenser simple but adequate means for thoroughly mixing and commingling the material before distribution, and then dispensing the same in forms and quantities as desired.

In the accompanying drawing—

Figure 2:
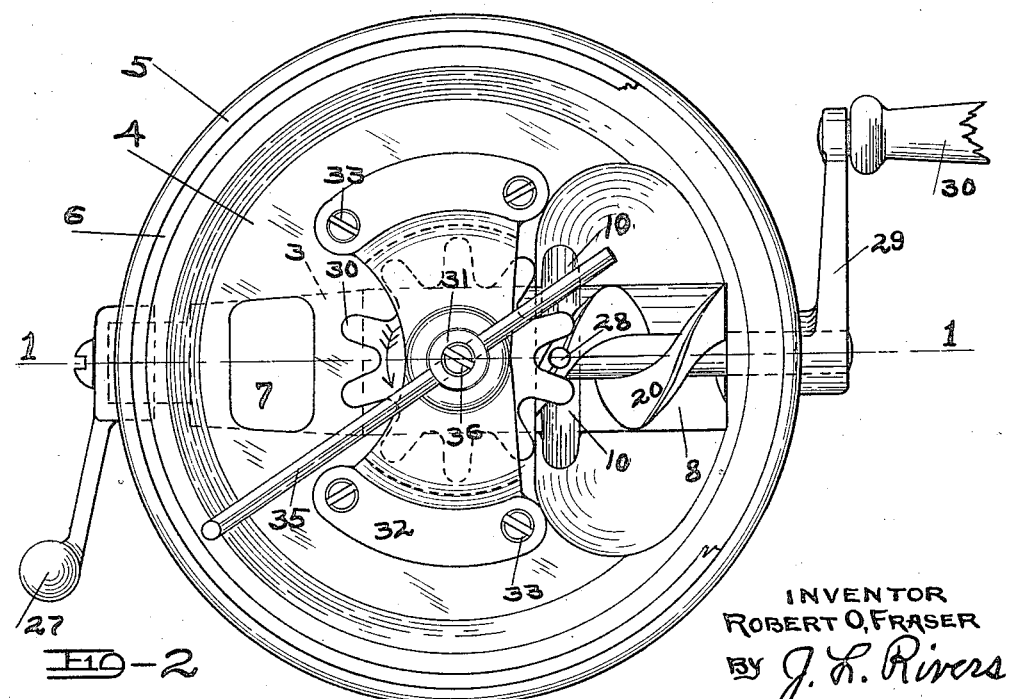
Fig. 2, is a plan view of the same as it appears when the food container is removed.

Referring more particularly to the drawing, 1 denotes the base, and 2 a standard connected therewith and supporting the body 3. In the present embodiment of the invention, the body in its major portion, is approximately semi-circular in cross-section, and tapers slightly at one end, as indicated in Fig. 2. It is surmounted by a circular plate 4, having a rim 5, comprising a seat for a food container 6. Said body is provided with upper openings 7 and 8 which extend through the plate and communicate with the container. 9 denotes a discharge opening in the body, located at the lower portion of its tapered end, and 10 an interiorly located and circumferentially extending recess, the purpose of which will be presently described.

A conveyor screw and shaft 20 is journaled in the body; the plug 21, in threaded engagement with the body, affording a bearing for one end of the screw and shaft, and what I term the tumbler 22, located in the opposite end of the body, carrying a bearing for the other end of said screw and shaft. This tumbler is frustro-conical in form, and it fits into and is rotative within the tapered end of the body, through the stub shaft 23 journaled therein. The hub 24, located within the tumbler, affords a bearing for said screw and shaft, the adjacent end of the shaft being reduced in diameter to accommodate the spring 25 which serves to hold the tumbler in place and impart a tight joint.

Figure 1:
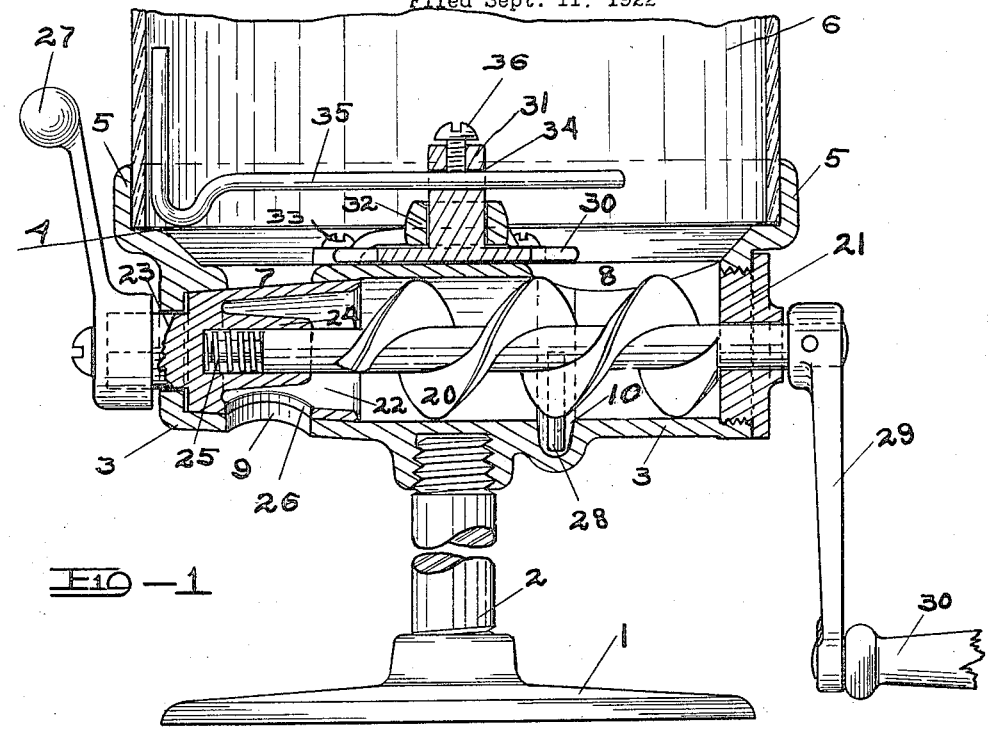
Figure 1 is a vertical section of the entire device, sectionized on the line 1—1, of Fig. 2, including a food container, said container, the supporting standard, and one of the handles being broken away to simplify the drawing.

As indicated at 26, Fig. 1, the tumbler is provided with a circular opening. This opening can be placed in alignment with the discharge opening 9 by rotating the tumbler through the handle 27 until the handle attains the upright position shown in Fig. 1. By reversing the movement of the handle to the extent that it occupies a downward and opposite position to that just described the opening 26 will align with the opening 7 communicating with the container. While said opening in the tumbler as shown is circular in form, it is obvious that it can be provided with openings of different forms, and means for identifying same, as specifically set forth in my former application heretofore mentioned, and whereby the material may be discharged in thin layers or shreds. 28 denotes a spur located on an edge of the conveyor screw, and 29 and 30 a crank and handle for actuating the screw and shaft.

A sprocket wheel 30, carrying a hub 31, is rotatably mounted in the bracket 32 secured to the plate 4 by the screws 33. Said hub is provided with a transverse opening 34 to carry a mixer and scraper 35, the screw 36 permitting longitudinal adjustment so that the same can be adapted to containers of different diameters. Its operative position is as indicated in Fig. 1, the vertically extending section being adjacent the inner wall of the container. When adjusted as shown, the spur 28 engages the teeth of the sprocket 30, and each revolution of the screw conveyor will move the sprocket wheel forward one tooth, which in turn will impart a rotary movement to the mixer and scraper, which commingles the material and scrapes the same from the sides of the container. The recess 10 affords a free action of the spur within the body, and the opening 8 in the plate and body permits engagement of the spur with said sprocket wheel.

Peanut butter is commonly sold at wholesale in cylindrical containers of standard size, and the plate 4, Fig. 2, with its rim 5, is designed to tightly fit the top of one of said containers. In dispensing this commodity therefrom, the mixer and scraper being first adjusted to the inside diameter of the container and the top of the same having been removed, the device is placed over the open portion of said container, and then reversed, the machine resting on its base, and the container and contents seated on the plate 4, as indicated in Fig. 1. As is evident, the peanut butter will now come in contact with the screw conveyor through the opening 8, and the device is ready for use.

By lowering the handle 27, as heretofore described, the discharge opening 9 is closed, and the opening 26 in the tumbler comes in alignment with the opening 7 in the plate 4. The force of gravity acting on the peanut butter through the opening 8 and the actuation of the screw conveyor will force the material to the tapered end of the body and up through the opening 7 into the container, while material is continually being supplied to the conveyor through the opening 8 at the other end of the body. A few turns of the conveyor will thus serve to mix and commingle the material in the container. By raising the handle 27 to the position heretofore described, an opening in the tumbler comes in alignment with the discharge opening 9 of the body, and the machine is ready for distribution. Each turn of the screw conveyor gives movement to the mixer and scraper, as heretofore described, and contributes to the mixing and blending of the material, as well as performing the additional function of scraping the inner surfaces of the container.

Foods in plastic condition necessarily contain considerable liquid, and the means herein provided and described are designed and adapted to blend and make such material homogeneous and put it in best possible condition for distribution, accomplishing the same in a sanitary and convenient way. While the use of the machine has been specially mentioned in connection with peanut butter it is equally adapted for dispensing cottage cheese or any other foods in plastic condition. When the device is not in use for distributing purposes, a turn of the handle 27 closes the discharge opening, leaving the contents free from exposure or contamination.

Obviously a glass container can be used, if desired, and any suitable means utilized for securing the container to the machine. The vertically extending portion of the mixer and scraper, as shown in its preferred form, is comparatively short in length. Should it be desirable to make it longer or of a different form, it is well within my invention to do so. Other changes in and modification of the construction described may be made without departing from the spirit of my invention or sacrificing its advantages, hence I ask that I be not confined to the specific structure set forth.

I claim:

1. In a device of the class described, a hollow body, a container, a seat for the container surmounting the body, an outlet opening through the seat and communicating with the container and the front portion of the body, an inlet opening through the seat and communicating with the container and the back portion of the body, a screw conveyor rotatably mounted in the body and having a spur projecting therefrom, means for actuating said conveyor, a discharge opening at one end of the body, means for closing said discharge opening and means for closing the adjacent outlet opening into the container, a sprocket wheel bracketed above the screw of the conveyor and adjacent the inlet opening in rotatable engagement with said spur, said wheel provided with a hub having a transverse opening, a mixer and scraper mounted in the last-named opening, and means for longitudinal adjustment of the mixer and scraper.

2. In a device of the class described, having a hollow body and an open section in the upper portion thereof, a container communicating with said section, and a screw conveyor rotatable in the body, a sprocket wheel pivotally connected with the body and adjacent said section, said wheel provided with a hub having a transverse opening, a mixer and scraper, made from a single piece of stock and having a vertically extending end portion, mounted in said opening, means for longitudinal adjustment of said mixer and scraper, and a spur projecting from the screw conveyor adapted to engage said sprocket wheel and advance the mixer and scraper on each revolution of the screw conveyor.

3. In a device of the class described, having a hollow body and an open section in the upper portion thereof, a container communicating with said section, and a screw conveyor rotatable in the body, a gear wheel pivotally connected with the body and adjacent said section, a mixer and scraper secured to the wheel and operable within the container, and a spur connected with the conveyor adapted to engage the wheel and rotate the mixer and scraper.

ROBERT O. FRASER.